(12) United States Patent
Bradley et al.

(10) Patent No.: US 7,516,806 B2
(45) Date of Patent: Apr. 14, 2009

(54) SYSTEM AND METHOD FOR HEAT REMOVAL FROM CONFINED SPACES IN A MOTOR VEHICLE USING NATURAL ASPIRATION AND CURIE TEMPERATURE

(75) Inventors: James C. Bradley, New Haven, IN (US); Scott A. Wooldridge, Fort Wayne, IN (US); Rodney J. Klinger, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 89 days.

(21) Appl. No.: 11/460,765

(22) Filed: Jul. 28, 2006

(65) Prior Publication Data

US 2008/0023248 A1  Jan. 31, 2008

(51) Int. Cl.
*B60K 11/06* (2006.01)
*B60K 11/08* (2006.01)
*F01P 1/00* (2006.01)
*F01P 7/02* (2006.01)

(52) U.S. Cl. .............. 180/68.1; 123/41.01; 123/41.58

(58) Field of Classification Search .............. 123/41.01, 123/41.56, 41.58, 41.59, 41.6, 41.62, 41.63, 123/41.14; 165/41, 51; 180/68.1, 68.2; 236/35
See application file for complete search history.

(56) References Cited

U.S. PATENT DOCUMENTS

| | | | | |
|---|---|---|---|---|
| 4,438,732 | A | * | 3/1984 | Seifert ..................... 123/41.05 |
| 4,924,826 | A | * | 5/1990 | Vinson ..................... 123/195 C |
| 5,950,436 | A | | 9/1999 | Tunkel et al. |
| 6,854,544 | B2 | * | 2/2005 | Vide ......................... 180/68.6 |

* cited by examiner

*Primary Examiner*—Michael Cuff
*Assistant Examiner*—Ka Chun Leung
(74) *Attorney, Agent, or Firm*—Jeffrey P. Calfa; Mark C. Bach

(57) ABSTRACT

A system (30) and method for removing heat from a confined space such as from engine compartment or service brake of a motor vehicle where heat is generated by operation of a heat engine (12) that propels the vehicle or application of a friction brake. The system and method do not use engine or electrical power because natural aspiration is used to remove heated air and Curie Temperature of a ferromagnetic material is used to selectively allow and disallow natural aspiration.

10 Claims, 5 Drawing Sheets

SYSTEM AND METHOD FOR HEAT REMOVAL FROM CONFINED SPACES IN A MOTOR VEHICLE USING NATURAL ASPIRATION AND CURIE TEMPERATURE

FIELD OF THE INVENTION

This invention relates to removal of heat from confined spaces in a motor vehicle, such as from an engine compartment containing an engine that generates heat and from a wheel containing a friction brake that generates heat when operated to brake the wheel.

BACKGROUND OF THE INVENTION

A motor vehicle typically houses a heat engine in an engine compartment, usually forward of a cab or body containing the occupant compartment. Engine compartment temperatures are a matter of concern to vehicle designers because excessively high temperatures can have adverse effects on the performance and durability of various devices and systems.

Space within an engine compartment is often at a premium for vehicle designers. As an engine compartment becomes increasingly crowded, more components are exposed to engine compartment heat, and the more difficult it becomes to move air that can aid in limiting temperatures through the engine compartment.

Control of engine operating temperature can to some extent control temperatures in various locations in the engine compartment, but engine operating temperature may itself be affected by various considerations that impose a lower limit on operating temperature. For example, higher operating temperature may be necessary in order to enable compliance with relevant emission control regulations, and while the cooling system of a liquid cooled engine can be sized to allow an engine to have a higher operating temperature, more engine heat will be transferred by convention, conduction, and/or radiation to devices in the engine compartment, to the structure bounding the engine compartment, and to air in the engine compartment because those forms of heat transfer do not occur through the liquid cooling system.

Furthermore, radiator placement in certain vehicles causes at least some of the heat that is rejected to air flowing through the radiator to pass back through the engine compartment. Higher engine temperatures and reductions in air flow through an engine compartment can create hot spots, or hot zones, potentially affecting devices located in the immediate vicinity.

Consequently, certain vehicles may benefit from a heat removal system and method devoted to improving heat removal from such hot spots, or hot zones.

Another area where excessive heat may be generated involves service brakes at a vehicle's wheels for decelerating the vehicle when a brake pedal is depressed. The brakes are typically friction brakes that when operated, slow the vehicle by frictional force that converts kinetic energy into heat. A drum-type brake has brake shoes that are disposed within a confined space. Because significant heat can be generated in that space, it too may benefit from a heat removal system and method devoted to improving heat removal.

SUMMARY OF THE INVENTION

The present invention relates to a system and method for aiding heat removal from confined spaces of a motor vehicle, such as an engine compartment and a drum-type wheel brake. The invention utilizes principles of natural aspiration and of the Curie Temperature (sometimes called Curie Point) of ferromagnetic materials to allow the system and method to function essentially without consumption of energy when the vehicle is operating, thereby rendering the system and method essentially passive in the sense that power does not have to be drawn from either the engine or the electrical system.

An exemplary system embodying principles of the invention comprises a collection sub-system, a conveyance sub-system, an exit sub-system, and a sensor sub-system. The collection sub-system is organized and arranged to collect heat at a collection location within a generally confined space in a motor vehicle where a device whose operation generates heat is disposed. The conveyance sub-system provides a closed flow path having one end open to the collection sub-system and an opposite end open to the exit sub-system. The sensor sub-system allows and disallows flow from the collection sub-system through the conveyance sub-system to the exit sub-system based on temperature in the confined space.

The collection sub-system can collect heat by convection, conduction, and or radiation. In general, the collection sub-system comprises a body that is shaped appropriately for the geometry of the confined space at the collection location and that has an entrance through which an interior void is made open to the confined space. The entrance is located at one end of the body. The conveyance sub-system extends from an opposite end, comprising a walled passageway through which flow from the collection sub-system can pass to the exit sub-system when the sensor sub-system allows flow.

The exit sub-system serves to induce flow from the confined space into and through the collection sub-system and through the conveyance sub-system using the principle of natural aspiration, the same principle used in a naturally aspirated internal combustion engine to draw air into the engine. The exit sub-system communicates an end of the conveyance sub-system that is opposite the collection sub-system with a source of partial vacuum created by operation of the vehicle. When the sensor sub-system is allowing naturally aspirated flow and the vehicle is operating to create partial vacuum at the exit sub-system, a pressure differential is created between the collection sub-system entrance and the exit sub-system that creates naturally aspirated flow through the collection sub-system and the conveyance sub-system to the exit sub-system, drawing heated air out of the confined space to which the collection sub-system is open.

By making the collection sub-system body approximate a "black body" as that term is understood in physics, the collection sub-system is endowed with the ability to absorb heat and to re-radiate the absorbed heat. Absorbed heat radiated to the interior void of the collection sub-system body will heat the naturally aspirated through-flow entering from the confined space. Heat transfer to the through-flow will also occur by contact of the through-flow with the wall surface of the interior void. The radiated and transferred heat are conveyed with heated air from the confined space through the conveyance sub-system to the exit system and from there to the ambient atmosphere. Hence, while air is the medium that is used to remove heat from the confined space, the collection system, by virtue of being disposed within the confined space and suitably constructed, can collect heat not only by collecting heated air from the confined space, but also by conductive and radiated heat transfer from the wall of the collection sub-system body.

In allowing and disallowing flow from the collection sub-system through the conveyance sub-system to the exit sub-system, the sensor sub-system utilizes the Curie Temperature of a ferromagnetic material, enabling heat removal to be controlled without drawing energy from the engine or the electrical system. The use of natural aspiration for heat removal flow also avoids power draw from the engine or electrical system.

One generic aspect of the invention relates to a self-propelled vehicle comprising wheels on which the vehicle travels, at least some of which wheels are driven to self-propel the vehicle when the vehicle is being operated and a heat removal system for removing heat from a confined space containing a device that generates heat when the vehicle is being operated.

The heat removal system comprises a collection sub-system for collecting heat in the confined space, a conveyance sub-system for conveying heat from the collection sub-system to an exit sub-system, and a sensor sub-system for allowing and disallowing conveyance of heat collected by the collection sub-system through the conveyance sub-system to the exit sub-system based on temperature in the confined space.

The exit sub-system is open to ambient atmosphere and is constructed and arranged to apply to the conveyance sub-system a partial vacuum that is created as a result of the vehicle being operated.

When the sensor sub-system allows conveyance of heat, the partial vacuum creates natural aspiration of air carrying heat from the collection sub-system through the conveyance sub-system and the exit sub-system to ambient atmosphere thereby removing heat from the confined space to ambient atmosphere.

According to another generic aspect, the invention relates to a method for removing heat from a confined space in a self-propelled vehicle, which space contains a device that generates heat when the vehicle is being operated.

The method comprises: collecting heat in the confined space; on the basis of temperature in the confined space, selectively allowing and disallowing conveyance of collected heat to an exit that is open to ambient atmosphere; and operating the vehicle to create a partial vacuum at the exit that causes conveyance of heat by natural aspiration of air carrying heat from the confined space to the exit when conveyance of heat is allowed.

The invention also relates to a system for selectively removing heat from an engine compartment of a self-propelled vehicle containing a heat engine that operates to propel the vehicle when the vehicle is being operated and in the process generates heat in the engine compartment.

The system comprises a collection sub-system disposed in the engine compartment, an exit sub-system leading to ambient atmosphere, a conveyance sub-system from the collection sub-system to the exit sub-system, and a sensor sub-system for allowing and disallowing the system to remove heat.

The exit sub-system is open to ambient atmosphere and is constructed and arranged to apply to the conveyance sub-system a partial vacuum that is created as a result of the vehicle being operated.

When the sensor sub-system allows removal of heat, the partial vacuum creates natural aspiration of air carrying heat from the engine compartment through the collection, conveyance, and exit sub-systems to ambient atmosphere, and when the sensor sub-system disallows removal of heat, natural aspiration through the collection, conveyance, and exit sub-systems to ambient atmosphere is stopped.

The foregoing, along with further features and advantages of the invention, will be seen in the following disclosure of a presently preferred embodiment of the invention depicting the best mode contemplated at this time for carrying out the invention. This specification includes drawings, now briefly described as follows.

DESCRIPTION OF THE PREFERRED EMBODIMENT

Figure 1:
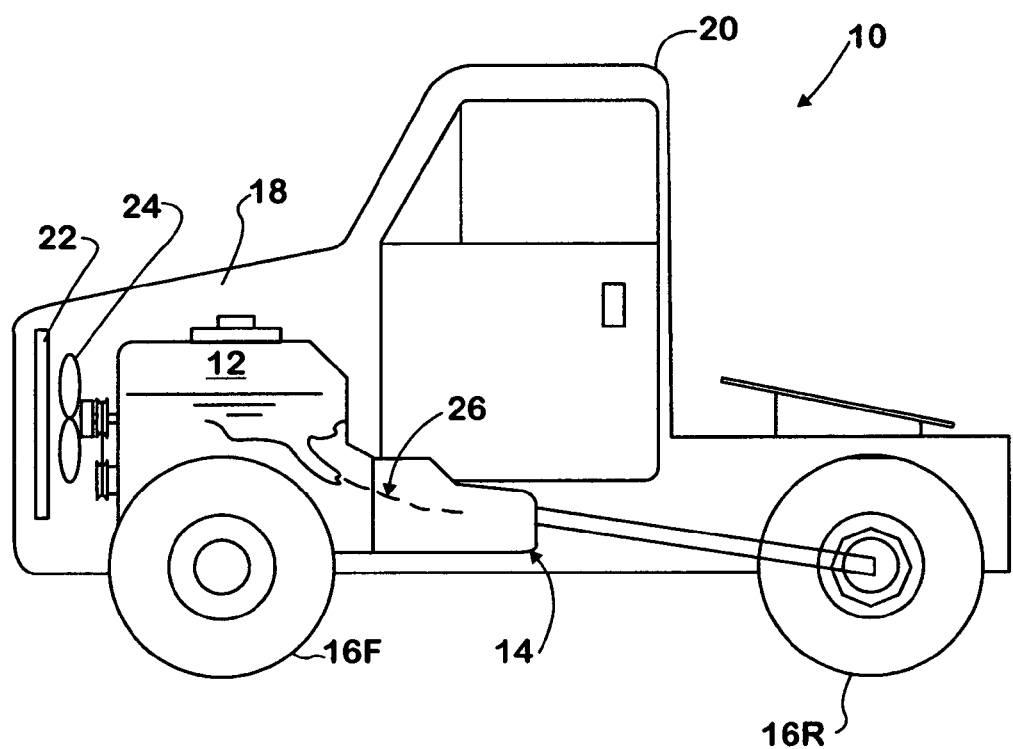
FIG. 1 shows a representative motor vehicle to which principles of the invention are applied.

FIG. 1 shows a truck 10 having an internal combustion engine 12, a diesel engine for example, and a drivetrain 14 that couples engine 12 to driven rear wheels 16R for propelling the truck. Engine 12 is housed within an engine compartment 18 that is forward of a cab 20.

Engine 12 is liquid-cooled, with the engine cooling system comprising a radiator 22 disposed generally vertical at the front of engine compartment 18 behind a grille opening. A fan 24 behind radiator 22 can draw air through radiator 22 to aid in cooling engine coolant flowing through radiator 22 when needed.

Engine 12 also has an exhaust system 26 for conveying exhaust gases generated by combustion of fuel in cylinders of engine 12 from the engine to the ambient atmosphere surrounding truck 10.

For reasons that were mentioned earlier, engine heat may create temperatures within engine compartment 18 that are higher than desired. Consequently, a heat removal system that can remove some engine compartment heat may be helpful in avoiding undesirably high engine compartment temperatures.

Figure 2:
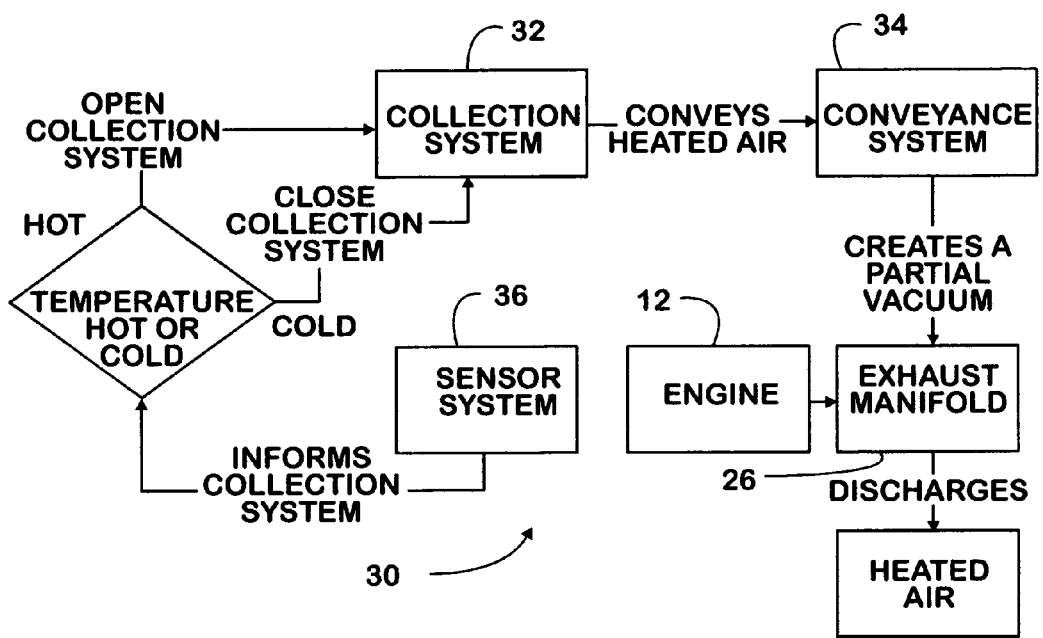
FIG. 2 is schematic diagram of a first embodiment illustrating principles of the invention.

A first embodiment of inventive heat removal system 30 is shown in FIG. 2 to comprise a collection sub-system 32 for collecting heat in engine compartment 18, a conveyance sub-system 34 for conveying heat from collection sub-system 32 to an exhaust manifold of exhaust system 26, and a sensor sub-system 36 for allowing and disallowing conveyance of heat collected by collection sub-system 32 through conveyance sub-system 34 to exhaust system 26 based on temperature in engine compartment 18.

Exhaust system 26 serves as an exit sub-system that is open to ambient atmosphere. When engine 12 is running, the exhaust flow applies a partial vacuum to the outlet of conveyance sub-system 34 by an effect similar to that performed by an ejector or eductor. When sensor sub-system 36 allows conveyance of engine compartment heat by opening collection sub-system 32 to conveyance sub-system 34, the partial vacuum creates natural aspiration of air carrying engine compartment heat from collection sub-system 32 through conveyance sub-system 34 and the exit sub-system to ambient atmosphere thereby removing heat from the engine compartment to ambient atmosphere. The use of natural aspiration for heat removal avoids power draw from engine 12 or the electrical system of truck 10.

For opening and closing collection sub-system 32 to conveyance sub-system 34, sensor sub-system 36 utilizes the Curie Temperature of a ferromagnetic material, enabling heat removal to be controlled without drawing energy from the engine or the electrical system.

A ferromagnetic part senses engine compartment temperature. A magnet and the ferromagnetic part are organized and arranged such that when the temperature of the ferromagnetic part does not exceed the Curie Temperature, the magnetic force exerted by the magnet on the ferromagnetic part relatively positions them to close collection sub-system 32 to conveyance system 34, disallowing the natural aspiration of heated air out of the engine compartment. When the temperature of the ferromagnetic part equals or exceeds the Curie Temperature, the loss of ferromagnetism in the part allows the part and magnet to assume relative positions that open collection sub-system 32 to conveyance system 34, disallowing natural aspiration.

The operating position of an obturator for allowing and disallowing natural aspiration is established by the relative positions of the ferromagnetic part and the magnet. When the part and magnet assume relative positions that allow natural aspiration, the obturator opens collection sub-system 32 to conveyance system 34. When the part and magnet assume relative positions that disallow natural aspiration, the obturator closes collection sub-system 32 to conveyance system 34.

Figure 2A:
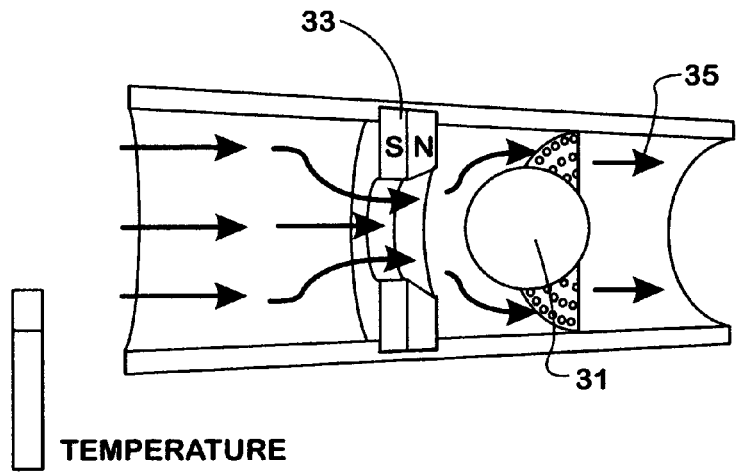
FIG. 2A is a longitudinal cross section view through an example of a device that incorporates certain functions performed in accordance with principles of the invention.

FIG. 2A shows an example where the obturator, a sphere 31, is unseated from a magnet 33 above a certain temperature to allow flow indicated by arrow 35. Attribution for this example is given to Invention Machine Corporation.

Collection sub-system 32 is embodied by way of example as a walled body having an interior void and an entrance to that void through which the void is open to air in engine compartment 18. By making the walled body approximate a "black body" as that term is understood in physics, it becomes an approximate ideal absorber of radiant heat. This allows the body wall to collect heat radiated from engine 12 and to re-radiate the heat to the interior void. Heat is also transferred by conduction to air that is in contact with the interior wall surface of the void.

Figure 5:
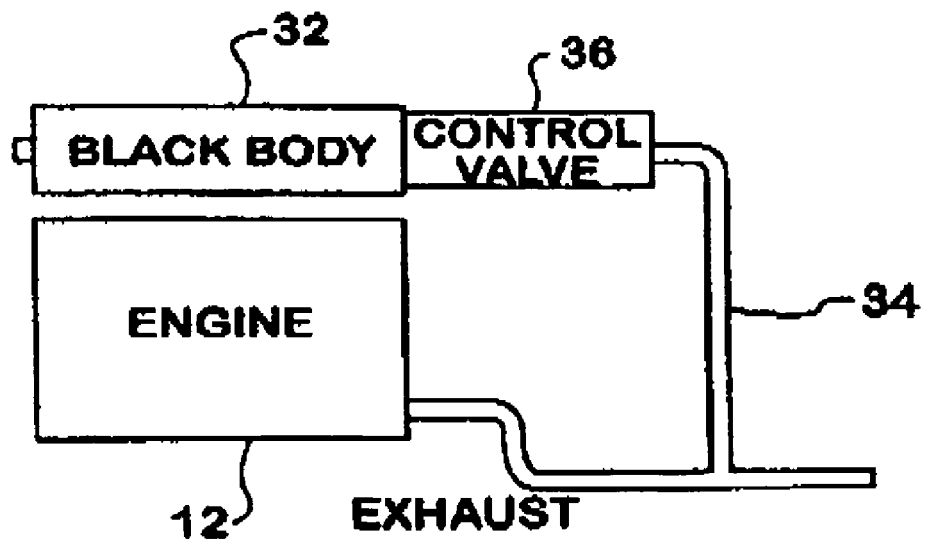
FIG. 5 is a diagram similar to FIG. 4 showing a different application.

FIG. 5 shows a "control valve" (understood to comprise the magnet, the ferromagnetic part, and the obturator), as sensor sub-system 36. The collection sub-system 32 comprises a walled black body having an entrance at an end opposite the end where the "control valve" is associated. The conveyance sub-system tees into exhaust system 26 to provide the exit to ambient atmosphere for both engine exhaust and removed engine compartment heat.

Figure 3:
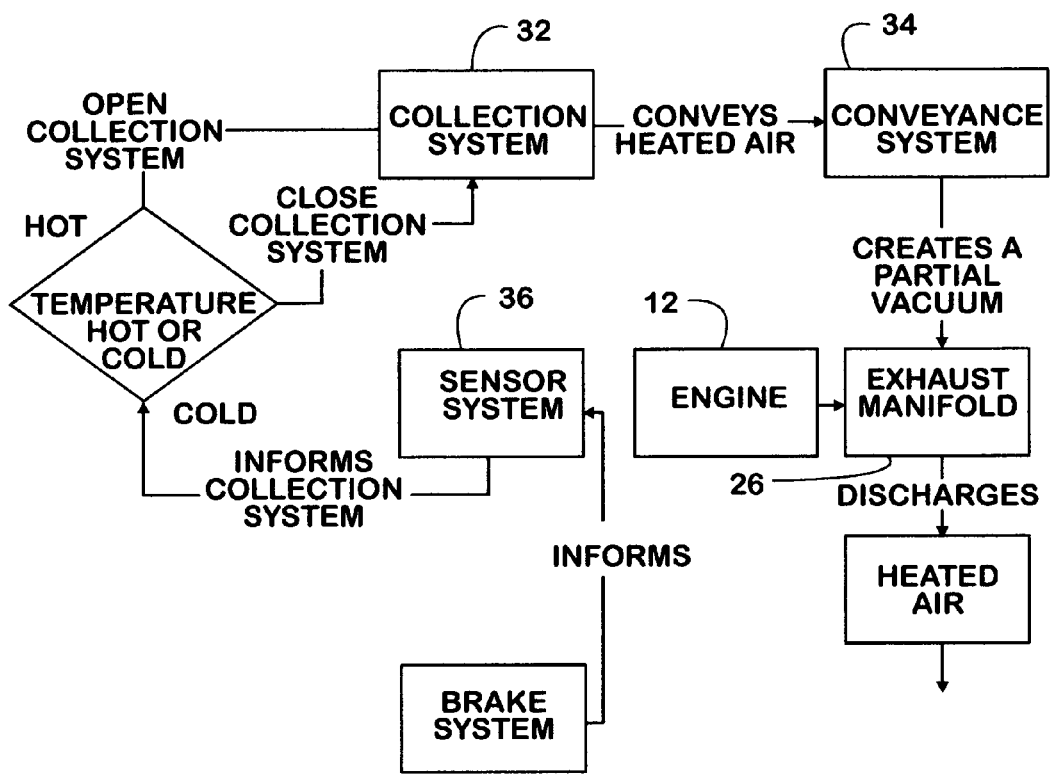
FIG. 3 is schematic diagram of a second embodiment.

FIG. 3 shows principles of the invention being applied to removal of heat from the service brakes of truck 10. Both rear wheels 16R and front wheels 16F have friction brake mechanisms that when operated by a brake pedal inside cab 20 to brake the truck generate heat. In the case of a drum-type brake the heat is generated within a confined space. Placement of a sensor sub-system 36 and a collection sub-system 32 in association with a friction brake can remove some of the brake heat, with the removed heat being removed to atmosphere as in FIG. 2.

Figure 6:
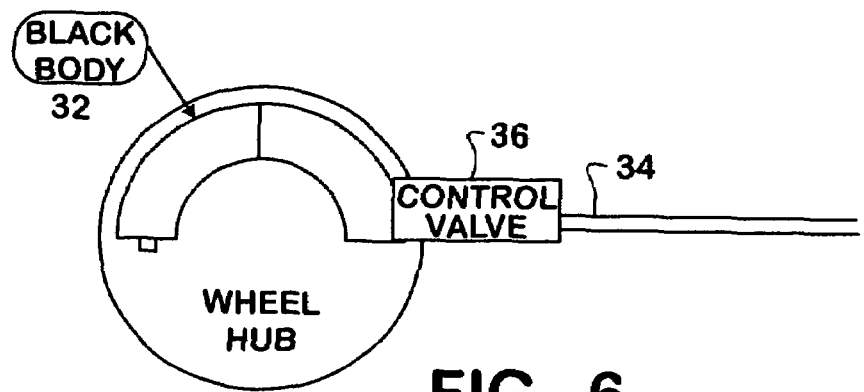
FIG. 6 is a diagram showing application of certain inventive principles to another portion of the vehicle shown in FIG. 1.
Figure 7:
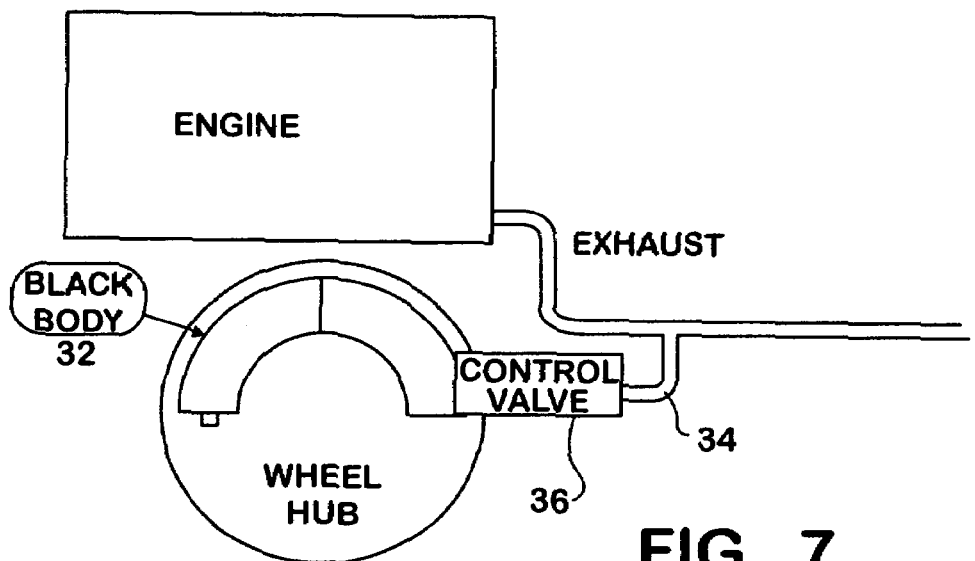
FIG. 7 is a diagram similar to FIG. 6 showing a different application.

FIGS. 6 and 7 show a sensor sub-system 36 and a collection sub-system 32 in association with a friction brake. The sensor sub-system is understood to comprise the magnet, the ferromagnetic part, and the obturator, collectively named "control valve" in both Figures. The collection sub-system comprises a walled black body having an entrance at an end opposite the end where the sensor sub-system is associated.

Figure 8:
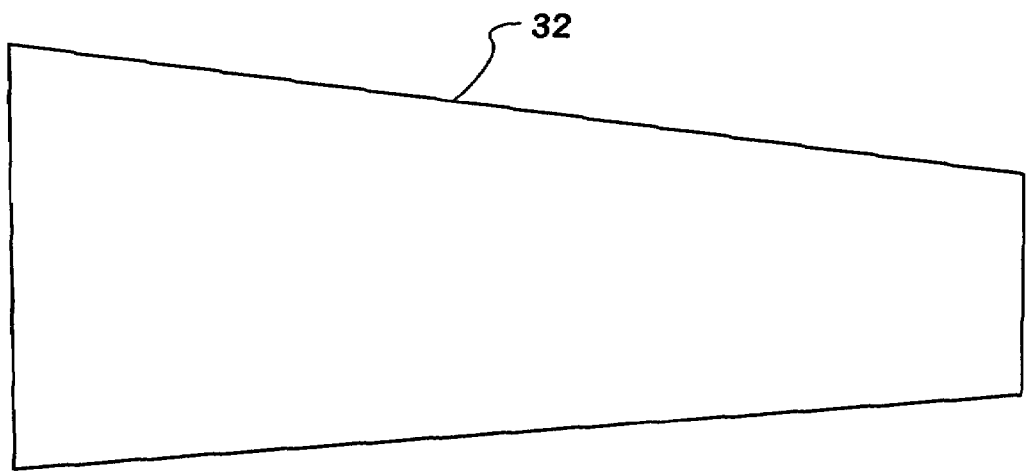
FIG. 8 is a generic representation of a preferred form for one sub-system of the invention.

Although not specifically shown by FIGS. 6 and 7, a preferred geometry for the body of collection sub-system has a narrowing taper in the direction of natural aspiration flow, as shown generically by FIG. 8.

The exit sub-system of FIG. 7 is the same as in FIGS. 2 and 3. The exit sub-system of FIG. 6 is somewhat different. The outlet of the exit system is open to ambient atmosphere and is arranged in relation the direction of air flow along the truck when the truck is moving such that partial vacuum is created at the outlet.

Figure 4:
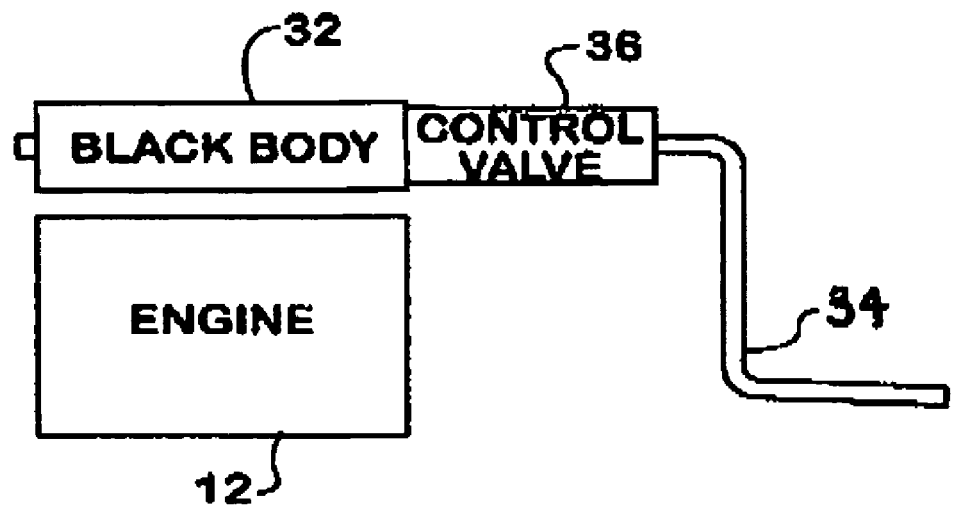
FIG. 4 is a diagram showing application of certain inventive principles to a portion of the vehicle shown in FIG. 1.

FIG. 4 shows an embodiment like FIG. 5 insofar as sub-systems 32, 34, and 36 are concerned. The exit system of FIG. 5 is like the one in FIG. 7.

With the ability of the inventive system to selectively allow and disallow removal of heat from an engine compartment, it may be possible to incorporate the system into the design of an engine compartment in a way that makes obstruction of the radiator in winter, such as by covering, unnecessary.

While a presently preferred embodiment of the invention has been illustrated and described, it should be appreciated that principles of the invention apply to all embodiments falling within the scope of the following claims.

What is claimed is:

1. A self-propelled vehicle comprising:
   wheels on which the vehicle travels, a least some of which wheels are driven to self-propel the vehicle when the vehicle is being operated;
   a heat removal system for removing heat from a confined space containing a device that generates heat when the vehicle is being operated;
   the heat removal system comprising a collection sub-system for collecting heat in the confined space, a conveyance sub-system for conveying heat from the collection sub-system to an exit sub-system, the conveyance sub-system being disposed between the collection sub-system and the exit sub-system so that heat collected at the collection sub-system is conveyed through the conveyance sub-system to the exit sub-system, and a sensor sub-system for allowing and disallowing conveyance of heat collected by the collection sub-system through the conveyance sub-system to the exit sub-system based on temperature in the confined space;
   wherein the exit sub-system is open to ambient atmosphere and is constructed and arranged to apply to the conveyance sub-system a partial vacuum that is created as a result of the vehicle being operated, and when the sensor sub-system allows conveyance of heat, the partial vacuum creates natural aspiration of air carrying heat from the collection sub-system through the conveyance sub-system and the exit sub-system to ambient atmosphere thereby removing heat from the confined space to ambient atmosphere; and
   wherein the sensor sub-system comprises a ferromagnetic part characterized by a Curie Temperature defining the lower limit of a temperature range that causes the part to lose ferromagnetism when heated to a temperature within the range, and the ferromagnetic part functions to allow the natural aspiration when the part's temperature is within the range and to disallow the natural aspiration when the part's temperature is not within the range.

2. A vehicle as set forth in claim 1 wherein the sensor sub-system further comprises a magnet, and the ferromagnetic part and the magnet are organized and arranged such that when the temperature of the ferromagnetic part is not within the range, the magnetic force exerted by the magnet on the ferromagnetic part relatively positions them to disallow the natural aspiration, and when temperature of the ferromagnetic part is within the range, the loss of ferromagnetism in the part allows the part and magnet to assume relative positions that allow the natural aspiration.

3. A method for removing heat from a confined space in a self-propelled vehicle, which space contains a device that generates heat when the vehicle is being operated, the method comprising:

collecting, in a collection sub-system, heat generated in the confined space by the device;

on the basis of temperature in the confined space, selectively allowing and disallowing conveyance of collected heat from the collection sub-system through a conveyance sub-system to an exit sub-system that is open to ambient atmosphere; and operating the vehicle to create a partial vacuum at the exit sub-system that causes conveyance of heat collected by the collection sub-system by natural aspiration of air through the collection sub-system, then through the conveyance sub-system, and then through the exit sub-system to ambient atmosphere when conveyance of heat is allowed; and wherein the step of selectively allowing and disallowing conveyance of collected heat comprises using the Curie Temperature of a ferromagnetic part that senses temperature in the confined space to demarcate allowing conveyance of collected heat from disallowing conveyance of collected heat.

4. A method as set forth in claim 3 wherein the step of selectively allowing and disallowing conveyance of collected heat comprises exerting magnetic force on the ferromagnetic part.

5. A self-propelled vehicle comprising:

wheels on which the vehicle travels, at least some of which wheels are driven to self-propel the vehicle when the vehicle is being operated;

a heat removal system for removing heat from a confined space containing a device that generates heat when the vehicle is being operated;

the heat removal system comprising a collection sub-system for collecting heat in the confined space, a conveyance sub-system for conveying heat from the collection subs-system to an exit sub-system, the conveyance sub-system being disposed between the collection sub-system and the exit sub-system so that heat collected at the collection sub-system is conveyed through the conveyance sub-system to the exit sub-system, and a sensor sub-system for allowing and disallowing conveyance of heat collected by the collection sub-system through the conveyance sub-system to the exit sub-system based on temperature in the confined space;

wherein the exit subsystem is open to ambient atmosphere and is constructed and arranged to apply to the conveyance sub-system a partial vacuum that is created as a result of the vehicle being operated, and when the sensor sub-system allows conveyance of heat, the partial vacuum creates natural aspiration of air carrying heat from the collection sub-system through the conveyance sub-system and the exit sub-system to ambient atmosphere thereby removing heat from the confined space to ambient atmosphere;

wherein the collection sub-system comprises a body having an interior void, an entrance to the void from the confined space, and an outlet from the void to the conveyance sub-system; and wherein the body is constructed to have a black body characteristic approximating a perfect absorber of thermal radiation.

6. A self-propelled vehicle comprising;

wheels on which the vehicle travels, at least some of which wheels are driven to self-propel the vehicle when the vehicle is being operated;

a heat removal system for removing heat from a confined space containing a device that generates heat when the vehicle is being operated;

the heat removal system comprising a collection sub-system for collecting heat in the confined space, a conveyance sub-system for conveying heat from the collection sub-system to an exit sub-system, the conveyance sub-system being disposed between the collection sub-system and the exit sub-system so that heat collected at the collection sub-system is conveyed through the conveyance sub-system to the exit sub-system, and a sensor sub-system for allowing and disallowing conveyance of heat collected by the collection subsystem through the conveyance sub-system to the exit sub-system based on temperature in the confined space;

wherein the exit sub-system is open to ambient atmosphere and is constructed and arranged to apply to the conveyance sub-system a partial vacuum that is created as a result of the vehicle being operated, and when the sensor sub-system allows conveyance of heat, the partial vacuum creates natural aspiration of air carrying heat from the collection sub-system through the conveyance sub-system and the exit sub-system to ambient atmosphere thereby removing heat from the confined space to ambient atmosphere; and wherein the exit sub-system comprises an exhaust system for conveying exhaust flow from the engine to ambient atmosphere, and the conveyance sub-system is constructed and arranged to introduce the natural aspiration of the air carrying heat into the exhaust system for entrainment with the exhaust flow.

7. A method for removing heat from a confined space in a self-propelled vehicle, which space contains a device that generates heat when the vehicle is being operated, the method comprising:

collecting, in a collection sub-system, heat generated in the confined space by the device;

on the basis of temperature in the confined space, selectively allowing and disallowing conveyance of collected heat from the collection sub-system through a conveyance sub-system to an exit sub-system that is open to ambient atmosphere; and operating the vehicle to create a partial vacuum at the exit sub-system that causes conveyance of heat collected by the collection sub-system by natural aspiration of air through the collection sub-system, then through the conveyance sub-system, and then through the exit sub-system to ambient atmosphere when conveyance of heat is allowed;

wherein the step of collecting heat in the confined space comprises collecting heat in a body that has an interior void, an entrance to the void from the confined space, and an outlet from the void to the conveyance sub-system; and wherein the step of collecting heat in the body comprises collecting radiant heat by constructing the body to have a black body characteristic approximating a perfect absorber of thermal radiation.

8. A method for removing heat from a confined space in a self-propelled vehicle, which space contains a device that generates heat when the vehicle is being operated, the method comprising:
- collecting, in a collection sub-system, heat generated in the confined space by the device;
- on the basis of temperature in the confined space, selectively allowing and disallowing conveyance of collected heat from the collection sub-system through a conveyance sub-system to an exit sub-system that is open to ambient atmosphere; and
- operating the vehicle to create a partial vacuum at the exit sub-system that causes conveyance of heat collected by the collection sub-system by natural aspiration of air through the collection sub-system, then through the conveyance sub-system, and then through the exit sub-system to ambient atmosphere when conveyance of heat is allowed; and
- wherein the step of operating the vehicle to create a partial vacuum at the exit sub-system comprises operating a heat engine that propels the vehicle, conveying exhaust flow from the engine through an exhaust system to ambient atmosphere, and entraining the heat conveyed by natural aspiration with the exhaust flow through the exhaust system.

9. A system for selectively removing heat from an engine compartment of a self-propelled vehicle containing a heat engine that operates to propel the vehicle when the vehicle is being operated and in the process generates heat in the engine compartment, the system comprising:
- a collection sub-system disposed in the engine compartment, an exit sub-system leading to ambient atmosphere, a conveyance sub-system from the collection sub-system to the exit sub-system, and a sensor sub-system for allowing and disallowing the system to remove heat;
- wherein the exit sub-system is open to ambient atmosphere and is constructed and arranged to apply to the conveyance sub-system a partial vacuum that is created as a result of the vehicle being operated, and when the sensor sub-system allows removal of heat, the partial vacuum creates natural aspiration of air carrying heat collected from the engine compartment by the collection sub-system through the collection sub-system, then through the conveyance sub-system, and then the exit sub-system to ambient atmosphere, and when the sensor sub-system disallows removal of heat, natural aspiration through the collection, conveyance, and exit sub-systems to ambient atmosphere is stopped; and
- wherein the sensor sub-system comprises a ferromagnetic part characterized by a Curie Temperature defining the lower limit of a temperature range that causes the part to lose ferromagnetism when heated to a temperature within the range, and the ferromagnetic part causes the sensor sub-system to be effective to open the collection, conveyance, and exit sub-systems for natural aspiration when the part's temperature is within the range and to stop natural aspiration through the collection, conveyance, and exit sub-systems when the part's temperature is not within the range 10. A system for selectively removing heat from an engine compartment of a self-propelled vehicle containing a heat engine that operates to propel the vehicle when the vehicle is being operated and in the process generates heat in the engine compartment, the system comprising:
- a collection sub-system disposed in the engine compartment, an exit sub-system leading to ambient atmosphere, a conveyance sub-system from the collection sub-system to the exit sub-system, and a sensor sub-system for allowing and disallowing the system to remove heat;
- wherein the exit sub-system is open to ambient atmosphere and is constructed and arranged to apply to the conveyance sub-system a partial vacuum that is created as a result of the vehicle being operated, and when the sensor sub-system allows removal of heat, the partial vacuum creates natural aspiration of air carrying heat collected from the engine compartment by the collection sub-system through the collection sub-system, then through the conveyance sub-system, and then the exit sub-system to ambient atmosphere, and when the sensor sub-system disallows removal of heat, natural aspiration through the collection, conveyance, and exit sub-systems to ambient atmosphere is stopped; and
- wherein the exit sub-system comprises an exhaust system for conveying exhaust flow from the engine to ambient atmosphere, and the conveyance sub-system is constructed and arranged to introduce the air carrying heat collected from the engine compartment by the collection sub-system into the exhaust system for entrainment with the exhaust flow.

\* \* \* \* \*